Patented June 9, 1925.

1,541,598

UNITED STATES PATENT OFFICE.

TROY J. SNIDER AND WARD E. MARSHALL, OF TERRELL, TEXAS.

METHOD OF TREATING TRANSMISSION BANDS.

No Drawing.     Application filed September 27, 1923.   Serial No. 665,245.

*To all whom it may concern:*

Be it known that we, TROY J. SNIDER and WARD E. MARSHALL, citizens of the United States, residing at Terrell, in the county of Kaufman and State of Texas, have invented certain new and useful Improvements in Methods of Treating Transmission Bands, of which the following is a specification.

This invention relates to an improved method for treating transmission bands, brake linings, and the like.

A primary object of this invention is the provision of a composition with which transmission bands and linings adapted to perform similar services may be impregnated for rendering the same capable of effectively performing their functions over a relatively great period of time.

In certain types of planetary transmission sets, such as used in the "Ford" automotive vehicles, transmission bands are used, which operate within a bath of lubricating oil. These bands are constructed of fabric or analogous flexible material, and absorb a considerable quantity of the oil in which they bathe. Invariably the oil in which they operate gets between the band or lining and the surface over which the band engages and in time incident to translation between the band the surface caused by braking action carbon residue will settle between the band and said surface causing the effective surface of the brake band to become glazed and hard and unable to perform its function of braking with the member about which the same engages. This glazing of the brake band causes alternate grabbing and slipping of the same with the member which the same engages resulting in an eccentric operation of the mechanism with which it cooperates, which is known to the art as "chattering."

To obviate the above and prevent deterioration of the transmission band or lining, we provide a composition of matter consisting of the following ingredients and their respective proportions:

|  | Per cent. |
|---|---|
| Tallow | 75 |
| Soft petrolatum or petroleum jelly | 12½ |
| Castor oil | 12½ |

Referring to the method of treating the bands, they are placed in a sufficient quantity of the above mentioned composition and the composition heated to its boiling point, the lining or transmission bands remaining in the boiling liquid for a period of from ten to fifteen minutes. This is considered a sufficient time to permit all of the strands of the lining or band to become thoroughly saturated and impregnated with the composition. The bands or linings are then removed from the boiling mass and superfluous composition is wiped off the exposed surfaces of the lining or band, and after which the lining is ready for use.

The composition is, in fact, in the nature of a lubricant, and is much heavier than the lubricant in which the transmission bands ordinarily operate, such as in the Ford automotive vehicles. It can thus be seen that as the transmission bands are thoroughly impregnated with the improved composition, when the transmission bands are applied, they cannot absorb any of the lubricant in which they operate. Heretofore, the placing of dry transmission or brake bands in a lubricant within which they operated resulted in the band or lining absorbing a quantity of the lubricant in which it operated, so that the glazing and hardening of the band resulted as above mentioned. The improved composition, however, will keep the lining and band soft and pliable, so that the same will gradually and firmly grip the metal part upon which it operates as the band is tightened thereabout, and which is the most desirable application of the band in contra-distinction to the chattering effect above referred to.

Referring to the nature of the ingredients used in the improved composition, the tallow is preferably of animal extraction, being a very heavy fat which will not flow freely incident to the heat produced by reason of frictional engagement of the band with the member upon which it operates. This ingredient provides a base for the composition and maintains the soft petrolatum and castor oil suspended in proper condition, so that the same will not flow too freely from the lining or band when pressure is applied incident to a braking operation.

The castor oil is of course of vegetable extraction and is a lighter body than the tallow ingredients and flows more freely than the tallow at the same temperature. It is chiefly desirable for its viscid qualities and enables the brake band to secure a firm and easy grip upon the member on which it operates.

The petroleum jelly or soft petrolatum is a mineral product and provides the lubricating quality for the composition which in connection with the castor oil also enables the transmission band to obtain a gradual and firm gripping action upon the member on which it operates.

Referring to the action of the composition in connection with an application of the brake band or lining upon the part upon which it operates. As the band or lining is brought to bear on its drum, incident to a braking action, the pressure of the same to a certain extent forces the impregnated material from the lining onto the drum surface with which it engages and outwardly of the other surfaces of the band, preventing the lubricant within which the band is ordinarily run from absorbtion by the band. Upon release of pressure, the improved composition is spread along on the surface of the lining and incident to the heavy nature of the same when contrasted with an ordinary lubricating oil, it will effectively preserve the transmission band or lining with which it is impregnated to obviate the draw backs above referred to.

Various changes in the proportions of the ingredients above referred to, and substitution of equivalents may be made to the improved composition, without departing from the spirit of this invention or the scope of the claims.

We claim:

1. The method of treating brake or transmission bands which consists of boiling and impregnating the bands in a composition consisting of the following ingredients and their respective proportions:

|  | Per Cent. |
| --- | --- |
| Tallow | 75 |
| Castor oil | 12½ |
| Petroleum jelly | 12½ |

2. The method of treating textile brake or transmission bands which consists in the preparation of a composition consisting of a heavy tallow fat forming 75% of the composition, castor oil, forming 12½% of the composition, and a mineral lubricant of higher consistency than ordinary lubricating oils consisting of 12½% of the composition, immersing the transmission or brake bands in a boiling quantity of said composition, and permitting the same to remain therein from ten to fifteen minutes.

TROY J. SNIDER.
WARD E. MARSHALL.